United States Patent
Inoue

(10) Patent No.: US 9,020,353 B2
(45) Date of Patent: Apr. 28, 2015

(54) OPTICAL BRANCHING UNIT, OPTICAL COMMUNICATION SYSTEM, AND OPTICAL MULTIPLEXING METHOD

(75) Inventor: Takanori Inoue, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/502,058

(22) PCT Filed: Aug. 23, 2010

(86) PCT No.: PCT/JP2010/064150
§ 371 (c)(1),
(2), (4) Date: Apr. 13, 2012

(87) PCT Pub. No.: WO2011/045981
PCT Pub. Date: Apr. 21, 2011

(65) Prior Publication Data
US 2012/0201543 A1    Aug. 9, 2012

(30) Foreign Application Priority Data
Oct. 16, 2009    (JP) .................................. 2009-239011

(51) Int. Cl.
*H04J 4/00* (2006.01)
*H04B 10/00* (2013.01)
(Continued)

(52) U.S. Cl.
CPC ........ *H04J 14/0221* (2013.01); *H04B 10/0797* (2013.01); *H04B 10/291* (2013.01); *H04J 14/0201* (2013.01)

(58) Field of Classification Search
CPC ............... H04B 10/2916; H04B 10/29; H04B 10/2935; H04B 10/0777; H04B 10/2942; H04B 10/2914; H04B 10/0797; H04B 10/2971; H04B 10/291; H04B 10/2918; H04B 10/2912; H04B 10/2931; H04B 10/2937; H04B 10/02; H01S 3/302; H01S 3/06754; H01S 3/094011; H01S 2301/04; H01S 2301/02; H01S 3/094003; H01S 3/094015; H01S 3/094046; H01S 3/094061; H01S 3/09415; H01S 3/10007; H01S 3/1301
USPC ............ 398/104–105, 37, 160, 173–181, 43, 398/79–83; 359/333–359
See application file for complete search history.

(56) References Cited

U.S. PATENT DOCUMENTS
5,440,418 A * 8/1995 Ishimura et al. .............. 398/181
(Continued)

FOREIGN PATENT DOCUMENTS
CN        1500321 A    5/2004
(Continued)

OTHER PUBLICATIONS
Zyskind et al , Fast Power Transients in Optically Amplified Multiwavelength Optical Networks, Feb. 1996, OSA/OFC, pp. 451-454.*
(Continued)

Primary Examiner — Ken Vanderpuye
Assistant Examiner — Dibson Sanchez
(74) Attorney, Agent, or Firm — Sughrue Mion, PLLC

(57) ABSTRACT

An optical-branching unit enables suppression of deterioration of the transmission characteristic of a survivor signal without executing complex control of constant-power output. Optical-amplification means amplifies and supplies a input optical signal, and when not receiving the optical signal, amplifies and supplies amplified spontaneous emission that the optical-amplification means generates. Detection means detects whether the optical signal is input to the optical-amplification means. When the optical signal is not input to the optical-amplification means, control means sets gain that determines the magnitude of amplification in the optical-amplification means to a predetermined value greater than gain at the time the optical signal is input to the optical-amplification means. Add/drop-multiplexing means receives the output light from the optical-amplification means and other output light and multiplexes an optical signal of a predetermined wavelength in the output light from the optical-amplification means and an optical signal of a specific wavelength in the other output light.

7 Claims, 8 Drawing Sheets

(51) Int. Cl.
*H04J 14/02* (2006.01)
*H04B 10/079* (2013.01)
*H04B 10/291* (2013.01)

(56) References Cited

U.S. PATENT DOCUMENTS

| | | | |
|---|---|---|---|
| 5,719,697 A * | 2/1998 | Pedersen | 359/341.43 |
| 5,912,761 A * | 6/1999 | Jander et al. | 359/337.13 |
| 6,031,660 A * | 2/2000 | Park et al. | 359/341.4 |
| 6,072,601 A * | 6/2000 | Toyohara | 358/484 |
| 6,175,436 B1 * | 1/2001 | Jackel | 359/349 |
| 6,219,177 B1 * | 4/2001 | Tamura | 359/341.1 |
| 6,233,076 B1 * | 5/2001 | Iwata et al. | 398/14 |
| 6,339,495 B1 * | 1/2002 | Cowle et al. | 359/341.4 |
| 6,407,854 B1 * | 6/2002 | Shum | 359/341.41 |
| 6,424,458 B1 * | 7/2002 | Cornelius et al. | 359/341.4 |
| 6,728,029 B2 * | 4/2004 | Krummrich | 359/344 |
| 6,904,241 B2 * | 6/2005 | DeGrange et al. | 398/83 |
| 7,583,432 B2 * | 9/2009 | Ghiggino et al. | 359/337 |
| 8,036,526 B2 * | 10/2011 | Bogoni et al. | 398/1 |
| 8,116,626 B2 * | 2/2012 | Takeyama et al. | 398/34 |
| 8,508,842 B2 * | 8/2013 | Di Muro | 359/337.21 |
| 2001/0015838 A1 * | 8/2001 | Iwata et al. | 359/124 |
| 2001/0046084 A1 * | 11/2001 | Sugaya et al. | 359/337.4 |
| 2002/0024706 A1 * | 2/2002 | Meli | 359/173 |
| 2003/0058497 A1 * | 3/2003 | Park et al. | 359/127 |
| 2003/0058507 A1 | 3/2003 | Oomori | |
| 2004/0208519 A1 * | 10/2004 | Feldman et al. | 398/30 |
| 2004/0213575 A1 | 10/2004 | Aono | |
| 2006/0013583 A1 | 1/2006 | Fukushi et al. | |
| 2006/0024063 A1 * | 2/2006 | Onaka et al. | 398/149 |
| 2007/0064305 A1 * | 3/2007 | Bogoni et al. | 359/341.41 |
| 2007/0253718 A1 * | 11/2007 | Magri et al. | 398/175 |
| 2007/0274725 A1 | 11/2007 | Takeyama et al. | |
| 2008/0131121 A1 * | 6/2008 | Magri et al. | 398/59 |
| 2009/0116842 A1 * | 5/2009 | Stango et al. | 398/83 |
| 2009/0232497 A1 * | 9/2009 | Archambault et al. | 398/50 |
| 2010/0129082 A1 * | 5/2010 | Zhong et al. | 398/83 |

FOREIGN PATENT DOCUMENTS

| | | |
|---|---|---|
| JP | 3483680 B2 | 5/1997 |
| JP | 3821920 B2 | 6/1998 |
| JP | 2003-174412 A | 6/2003 |
| JP | 2004-527955 A | 9/2004 |
| JP | 2005-051598 A | 2/2005 |
| JP | 2006-033412 A | 2/2006 |
| JP | 2006-066946 A | 3/2006 |
| JP | 2007-526702 A | 9/2007 |
| JP | 2007-274545 A | 10/2007 |
| WO | 02/080409 A1 | 10/2002 |

OTHER PUBLICATIONS

Extended European Search Report, dated Jun. 10, 2013, issued by the European Patent Office in counterpart European Patent Application No. 10823249.7.

Motoshima, Kuniaki, et al., "Automatic Gain Control of Erbium-Doped Fiber Amplifiers for WDM Transmission Systems," IEICE Transactions on Communications, Communications Society, vol. E80-B, No. 9, Sep. 1, 1997, pp. 1311-1320.

Communication dated Aug. 20, 2014, issued by the State Intellectual Property Office of People's Republic of China in corresponding Chinese Application No. 201080046666.0.

* cited by examiner

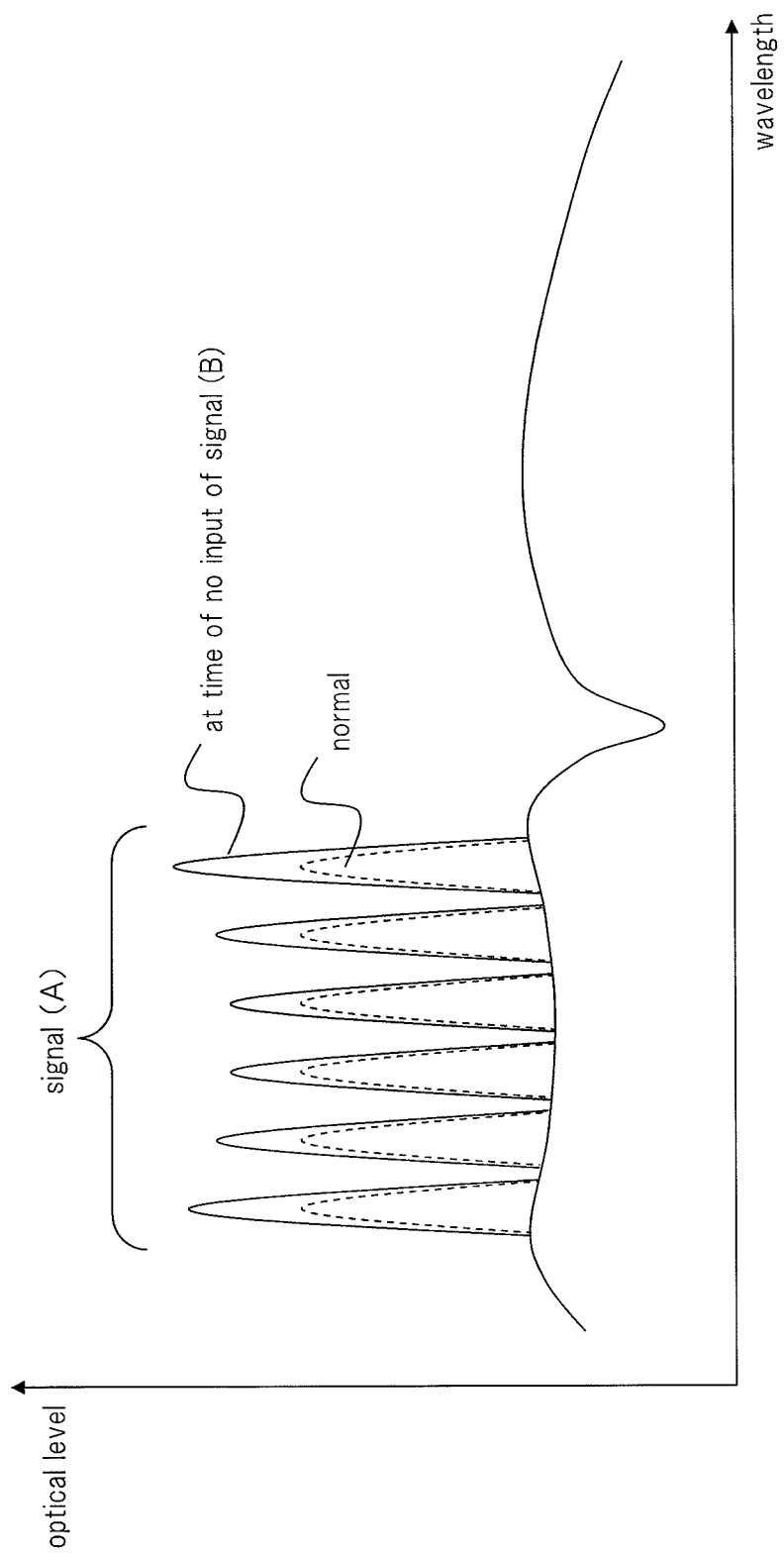

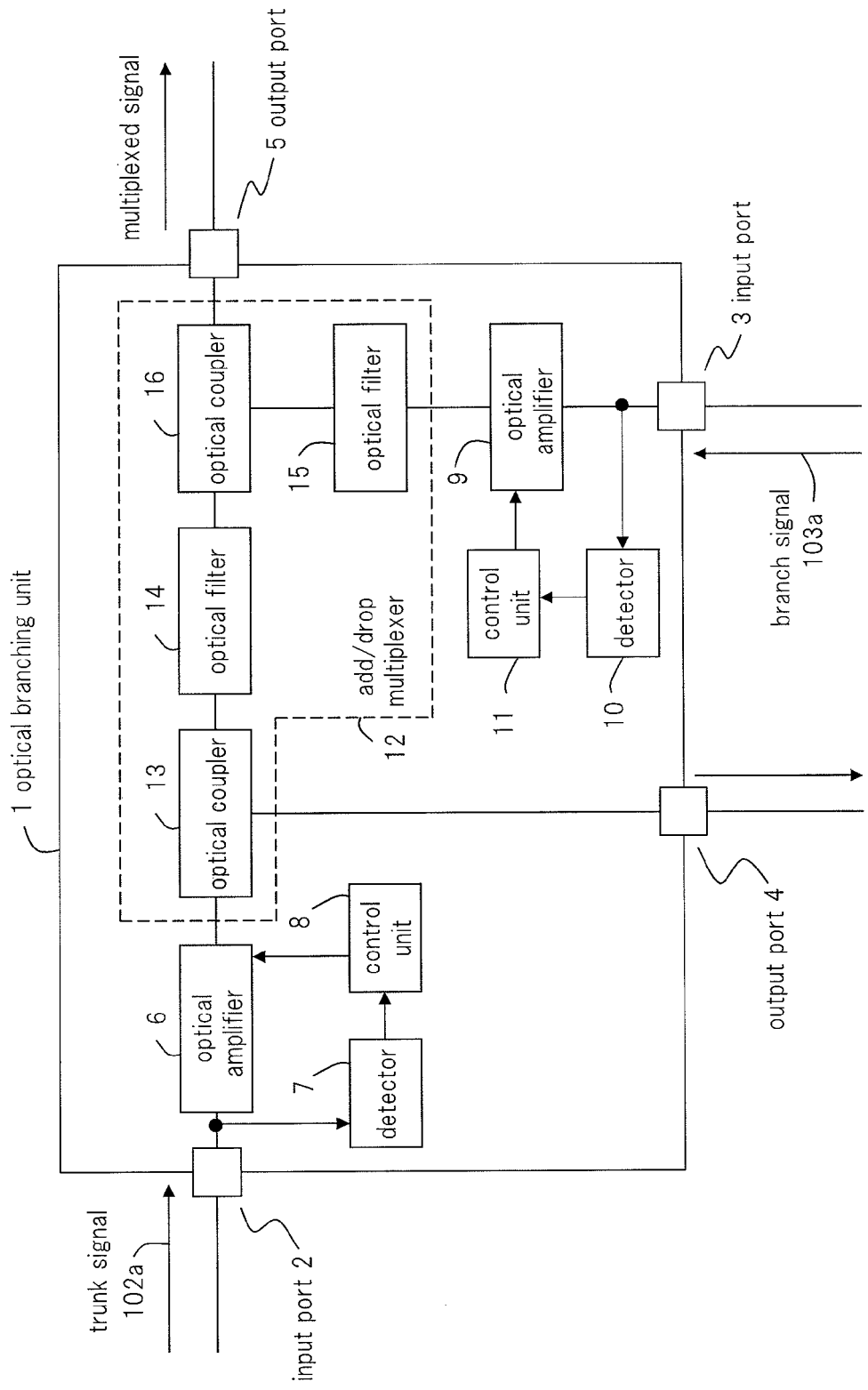

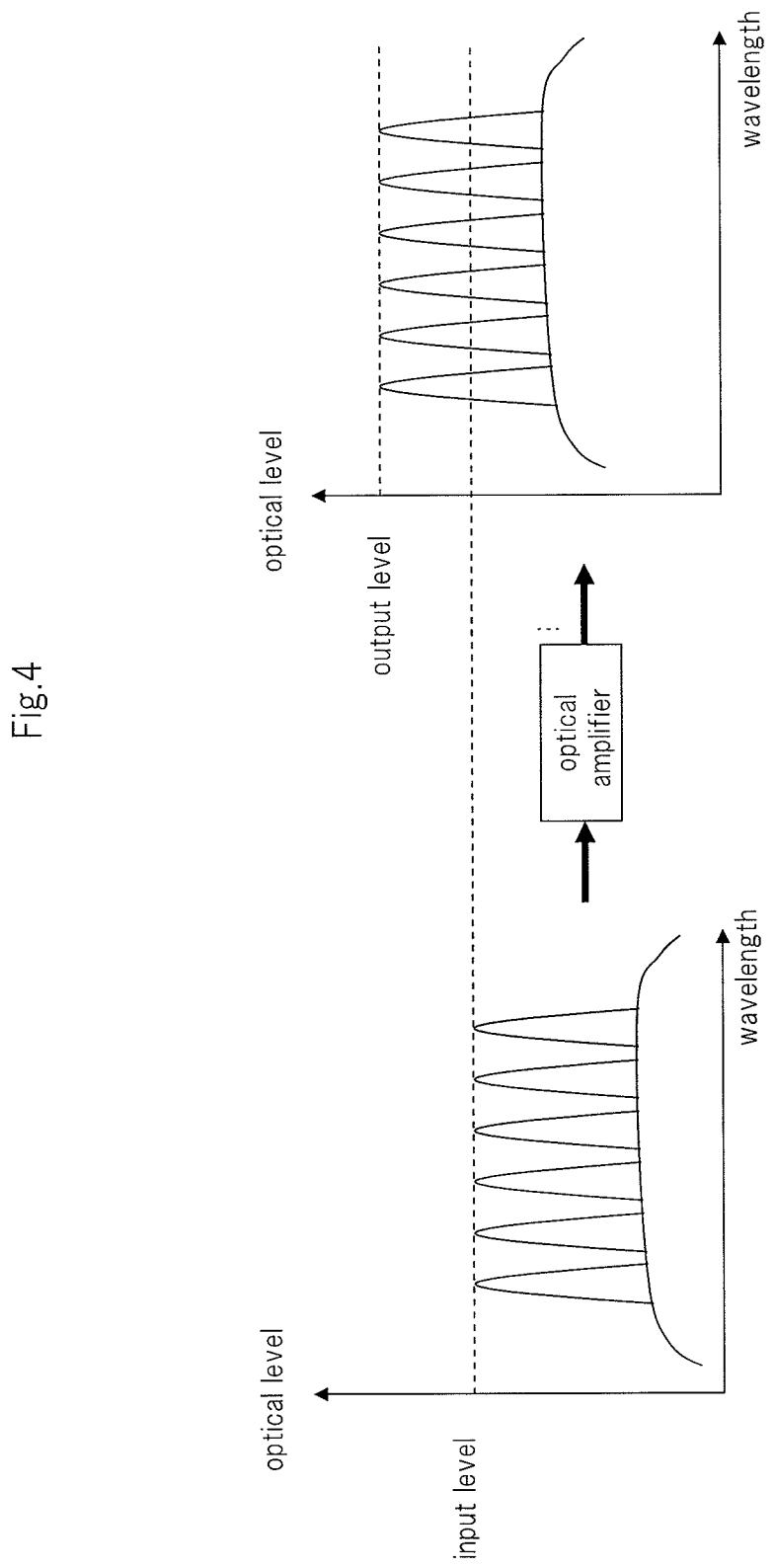

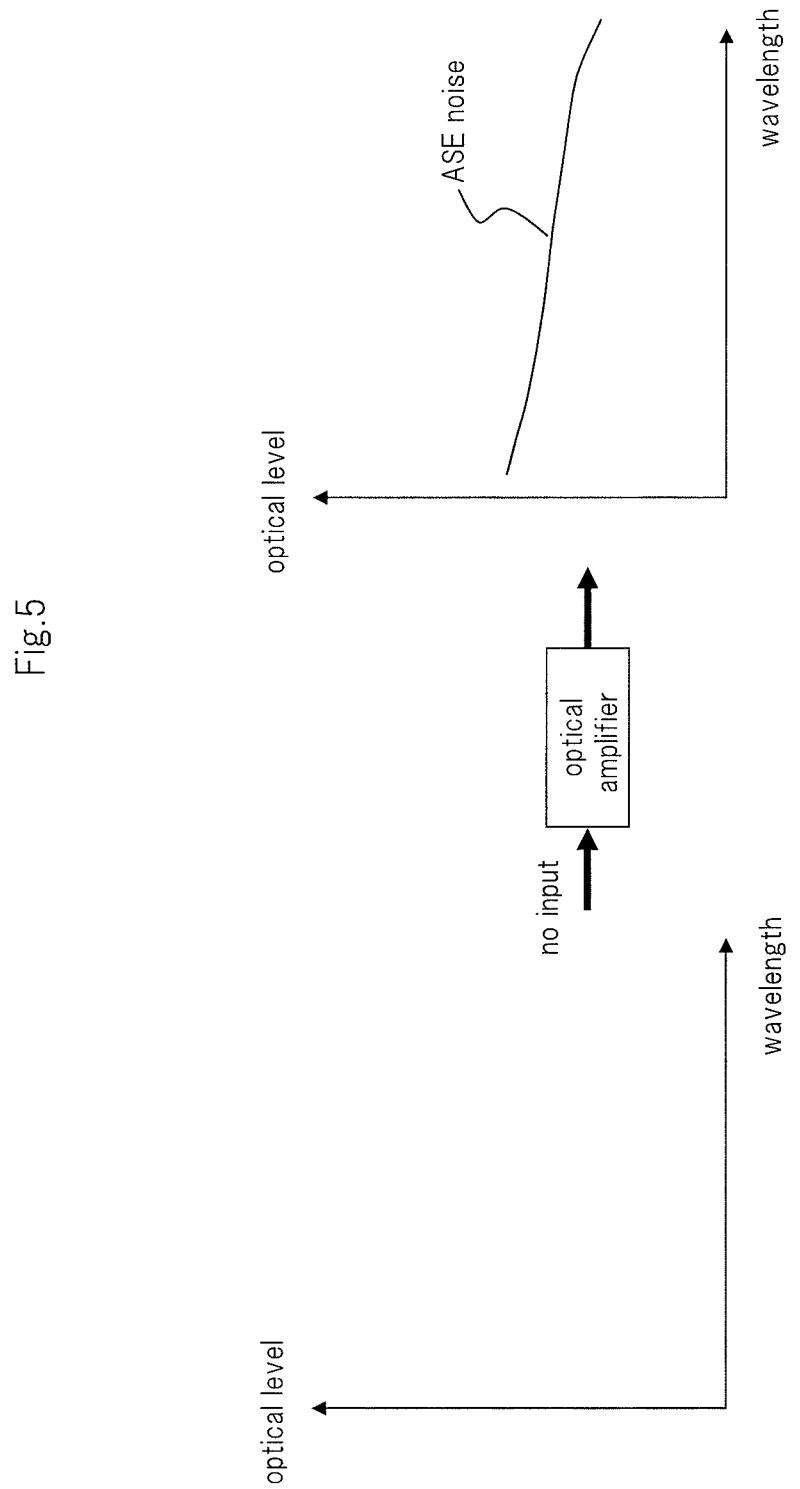

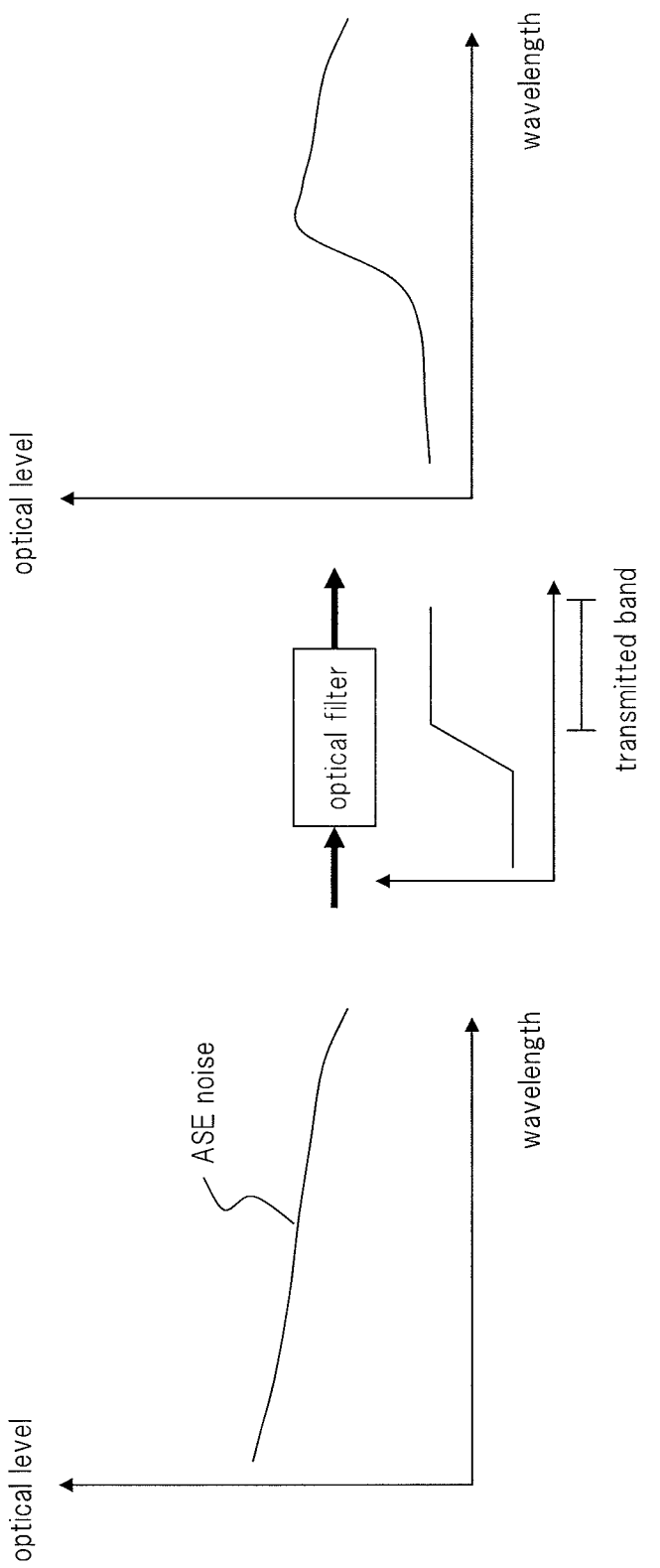

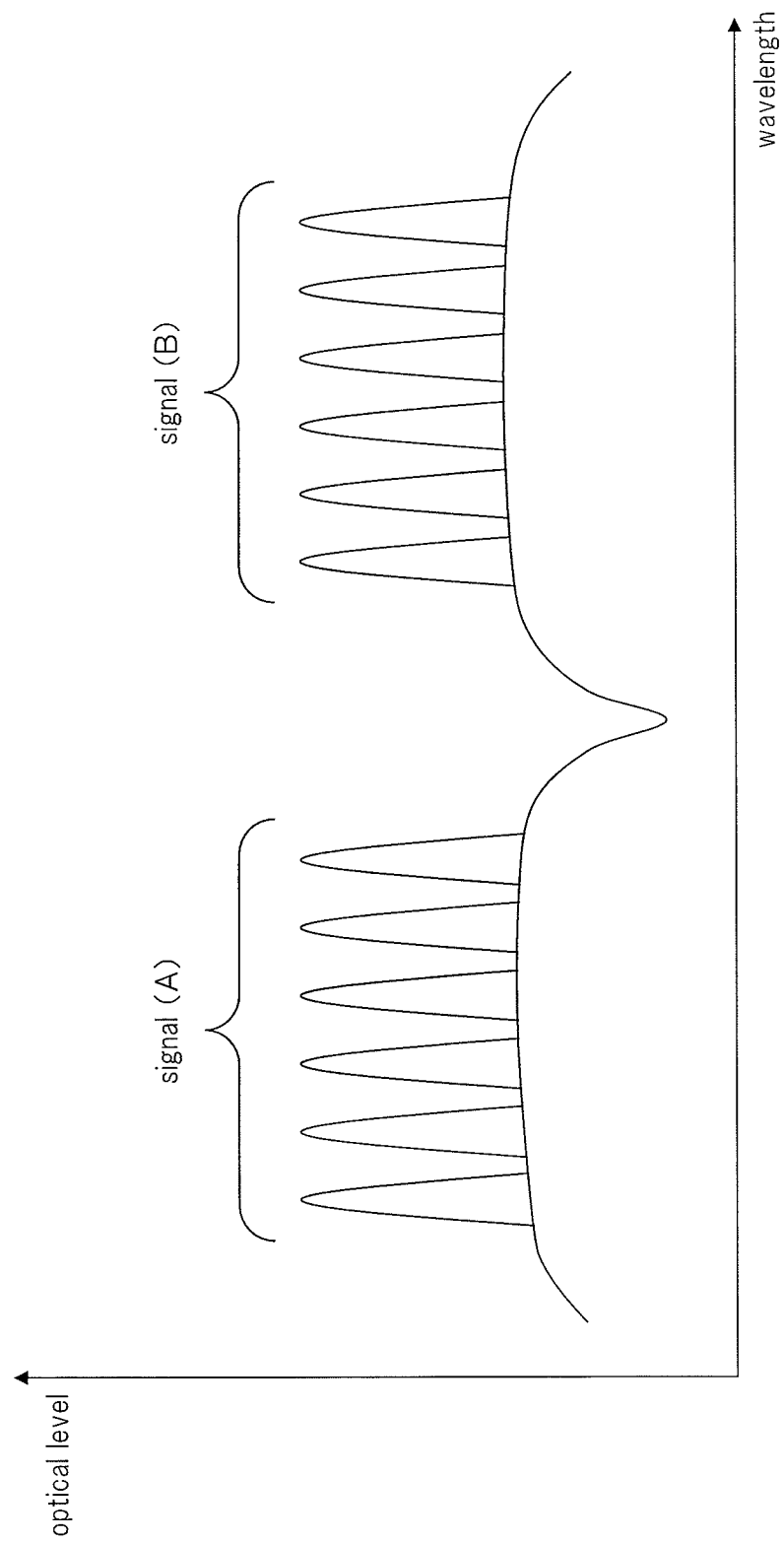

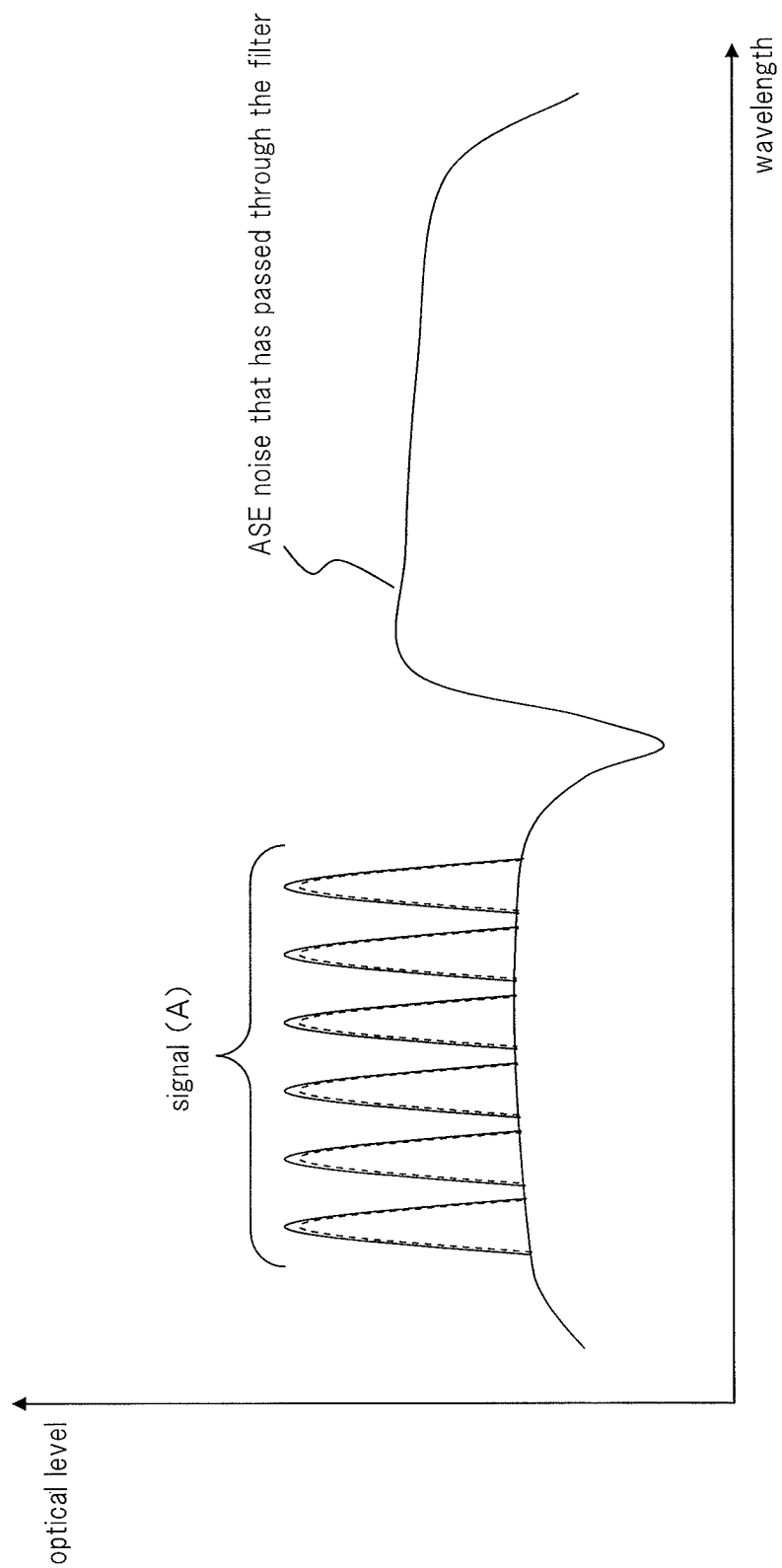

OPTICAL BRANCHING UNIT, OPTICAL COMMUNICATION SYSTEM, AND OPTICAL MULTIPLEXING METHOD

CROSS REFERENCE TO RELATED APPLICATIONS

This application is a National Stage of International Application No. PCT/JP2010/064150 filed Aug. 23, 2010, claiming priority based on Japanese Patent Application Nos. 2009-239011 filed Oct. 16, 2009, the contents of all of which are incorporated herein by reference in their entirety.

TECHNICAL FIELD

The present invention relates to an optical branching unit, an optical communication system, and an optical multiplexing method.

BACKGROUND ART

An optical add/drop multiplexer that can add and drop light of different wavelengths is used in, for example, optical communication systems in which light having different wavelengths is transmitted by a single optical fiber. An optical add/drop multiplexer is also referred to as an OADM. In a submarine cable system, an optical add/drop multiplexer is installed in an optical branching unit.

FIG. 1 is a block diagram showing an optical submarine cable system that includes optical add/drop multiplexers.

In FIG. 1, optical branching unit 101 receives two optical signals on an uplink line: optical signal (hereinbelow referred to as "trunk signal") 102a from trunk station 102 and optical signal (hereinbelow referred to as "branch signal") 103a from branch station 103.

Optical signal 102a1 includes an optical signal of a wavelength that belongs to trunk signal band 102a and an optical signal of a wavelength that belongs to drop signal band 102a2. Trunk signal band 102a1 and drop signal band 102a2 are determined by wavelength. Trunk signal band 102a1 and drop signal band 102a2 have no overlapping portions (bands) each other.

Optical signal 103a includes an optical signal having a wavelength that belongs to add signal band 103a1. Add signal band 103a1 is further determined by wavelength. In addition, add signal band 103a1 and drop signal band 102a2 are in the same wavelength band.

Optical add/drop multiplexers 101a transmit, from among optical signal 102a, optical signals that belong to trunk signal band 102a1 and supply, from among optical signal 102a, an optical signal belonging to trunk signal band 102a1 toward trunk station 104. Optical add/drop multiplexers 101a further branch and do not transmit, from among optical signal 102a, an optical signal that belongs to drop signal band 102a2 and supply, from among optical signal 102a, an optical signal that belongs to drop signal band 102a2 toward branch station 103. In addition, optical add/drop multiplexers 101a add, from among optical signal 103a, an optical signal belonging to add signal band 103a1 to the optical signal belonging to trunk signal band 102a1 that was transmitted and supply the multiplexed optical signals toward trunk station 104.

The optical signal that is supplied to trunk station 104 from optical branching unit 101 (the multiplexed signal of the optical signal belonging to add signal band 103a1 and the optical signal belonging to trunk signal band 102a1) is received at trunk station 104 by way of optical repeaters 106.

Optical repeaters 106 compensate loss of the optical signal due to the optical fiber in transmission line 105.

In the optical submarine cable system shown in FIG. 1, the above-described operation is also carried out on downlink lines.

In the optical submarine cable system such as shown in FIG. 1, in the event a no-input state in one of the two optical signals that are to be applied as input to one of the lines of optical branching unit 101 due to a fault such as a cable break, only the other optical signal (hereinbelow referred to as the survivor signal) is sent to the receiving station from optical branching unit 101.

Because optical repeaters 106 in a submarine cable system are operated by APC control (Automatic Pump Power Control), the output power of optical repeaters 106 is substantially fixed. As a result, when only a survivor signal is supplied from optical branching unit 101, this survivor signal is excessively amplified even more than in amplification carried out when there is an optical signal in a no-input state. As a result, the optical signal level per wave is increased, leading to deterioration of transmission characteristics due to a nonlinear optical effect.

In particular, when a cable breakage fault occurs in a cable between optical branching unit 101 and optical repeater 106 that is closest to optical branching unit 101, input (one optical signal) to optical branching unit 101 from the cable is completely cut off, and deterioration of the transmission characteristic of the survivor signal becomes prominent.

FIG. 2 shows how the signal level of another optical signal changes between a case in which one optical signal (signal B in FIG. 2) is present and the case of a no-input state. As shown in FIG. 2, when one optical signal enters a no-input state, the signal level of the other optical signal is higher than for a case in which one optical signal exists.

Patent Document 1 discloses an optical add/drop multiplexing system that can prevent excessive amplification of the other optical signal when one optical signal enters a no-input state. This optical add/drop system includes an optical amplifier unit, an output-power constant-control part, and an OADM unit.

Upon receiving the optical signal as input, the optical amplifier unit amplifies the optical signal. When an optical signal is not received as input, the optical amplifier unit supplies ASE (Amplified Spontaneous Emission) noise. ASE noise results from amplification by the optical amplifier unit of amplified spontaneous emission that occurs in the optical amplifier unit itself.

The output-power constant-control part monitors the output of the optical amplifier unit. The output-power constant-control part controls the optical amplifier unit such that the level of ASE that is supplied from the optical amplifier unit is the same level as the optical signal that is amplified by the optical amplifier unit when an optical signal is applied as input to the optical amplifier unit.

The OADM unit adds/drops an optical signal of a predetermined wavelength to the output light from the optical amplifier unit.

Essentially, this optical add/drop multiplexing system detects that an optical signal is not applied as input to the optical amplifier unit by monitoring the output of the optical amplifier unit. Then, upon detecting that an optical signal is not applied as input to the optical amplifier unit, this optical add/drop multiplexing system sets the level of ASE from the optical amplifier unit to the same level as the optical signal that is amplified by the optical amplifier unit when an optical signal is applied as input to the optical amplifier unit.

Thus, in a state in which an optical signal is not applied as input to the optical amplifier unit in this optical add/drop multiplexing system, ASE noise is used in place of the optical signal that is amplified and is supplied as output in the optical amplifier unit. As a result, the excessive amplification of the survivor signal can be prevented.

This optical add/drop multiplexing system is made up of an optical amplifier unit, an output-power constant-control part, and an OADM unit, these components being mutually independent.

LITERATURE OF THE PRIOR ART

Patent Documents

Patent Document 1: JP 2003-174412 A

SUMMARY OF THE INVENTION

Problem to be Solved by the Invention

The optical add/drop multiplexing system disclosed in Patent Document 1 entails the problem that output-power constant-control, which is complex control, must be carried out to adjust the output level of ASE noise.

In addition, in the optical add/drop multiplexing system disclosed in Patent Document 1, the optical amplifier unit and OADM unit are mutually independent devices. As a result, when, for example, the optical add/drop multiplexing system is installed on the sea floor, the optical amplifier unit and OADM unit are connected by a submarine cable installed on the sea floor.

The problem therefore arises that when a fault occurs in the cable (for example, a submarine cable) that connects the optical amplifier unit and OADM unit, the OADM unit is unable to use the ASE noise from the optical amplifier unit and the survivor signal is excessively amplified.

It is an object of the present invention to provide an optical branching unit, optical communication system, and optical multiplexing method that can solve any of the above-described problems.

Means for Solving the Problem

The optical branching unit of the present invention includes:
optical amplification means that, when an optical signal is received as input, amplifies and supplies the optical signal, or when the optical signal is not received as input, amplifies and supplies the amplified spontaneous emission that the optical amplification means itself generates;
detection means that detects whether the optical signal is applied as input to the optical amplification means;
control means that, when the detection means detects that the optical signal is not applied as input to the optical amplification means, sets gain that determines the magnitude of amplification in the optical amplification means to a predetermined value that is greater than the gain when the optical signal is being applied as input to the optical amplification means; and
add/drop multiplexing means that receives the output light from the optical amplification means and other output light and that multiplexes an optical signal of a predetermined wavelength that is contained in the output light from the optical amplification means and an optical signal of a designated wavelength that is contained in the other output light.

The optical branching unit of the present invention incorporates:
optical amplification means that, when an optical signal is received as input, amplifies and supplies the optical signal or, when the optical signal is not received as input, amplifies and supplies the amplified spontaneous emission that the optical amplification means itself generates; and
add/drop multiplexing means that receives output light from the optical amplification means and other output light and that multiplexes an optical signal of a predetermined wavelength that is contained in the output light from the optical amplification means and an optical signal of a designated wavelength that is contained in the other output light.

The optical communication system of the present invention includes: the above-described optical branching unit, a first optical repeater that supplies the optical signal to the optical amplification means that is contained in the optical branching unit; and a second optical repeater that supplies the other output light to the add/drop multiplexing means that is contained in the optical branching unit.

The optical multiplexing method of the present invention is an optical multiplexing method in an optical branching unit that includes an optical amplification means that, when an optical signal is received as input, amplifies and supplies the optical signal and when the optical signal is not being received as input, amplifies and supplies the amplified spontaneous emission that the optical amplification means itself generates; the optical multiplexing method including steps of:
detecting whether the optical signal is being received as input in the optical amplification means;
upon detecting that the optical signal is not being received as input in the optical amplification means, implementing control to set the gain that determines the magnitude of amplification in the optical amplification means to a predetermined value that is greater than the gain when the optical signal is being received as input in the optical amplification means;
receiving output light from the optical amplification means and other output light, and multiplexing an optical signal of a predetermined wavelength that is contained in output light from the optical amplification means and an optical signal of a designated wavelength that is contained in the other output light.

Effect of the Invention

According to the present invention, deterioration of the transmission characteristic of a survivor signal can be suppressed without implementing the complex control of output-power constant-control.

In addition, according to the present invention, the incorporation of an optical amplification means in an optical branching unit that contains add/drop multiplexing means enables a decrease of a state in which the add/drop multiplexing means is unable to use the amplified spontaneous emission from the optical amplification means.

BRIEF DESCRIPTION OF THE DRAWINGS

FIG. 2 shows the change in signal level of another optical signal in the case in which one optical signal is present and is in a no-input state.

FIG. 3 is a block diagram showing optical branching unit 1 of an exemplary embodiment of the present invention.

FIG. 4 is a view for describing the operation of the optical amplifier during normal operation.

FIG. 5 is a view for describing the operation of an optical amplifier when there is no input.

FIG. 6 is a view for describing the operation of an optical filter.

FIG. 7 is a view for describing a trunk signal from optical branching unit 1 during normal operation.

FIG. 8 is a view for describing a trunk signal from optical branching unit 1 in a state in which one of two inputs enters a no-input state.

BEST MODE FOR CARRYING OUT THE INVENTION

Figure 1:
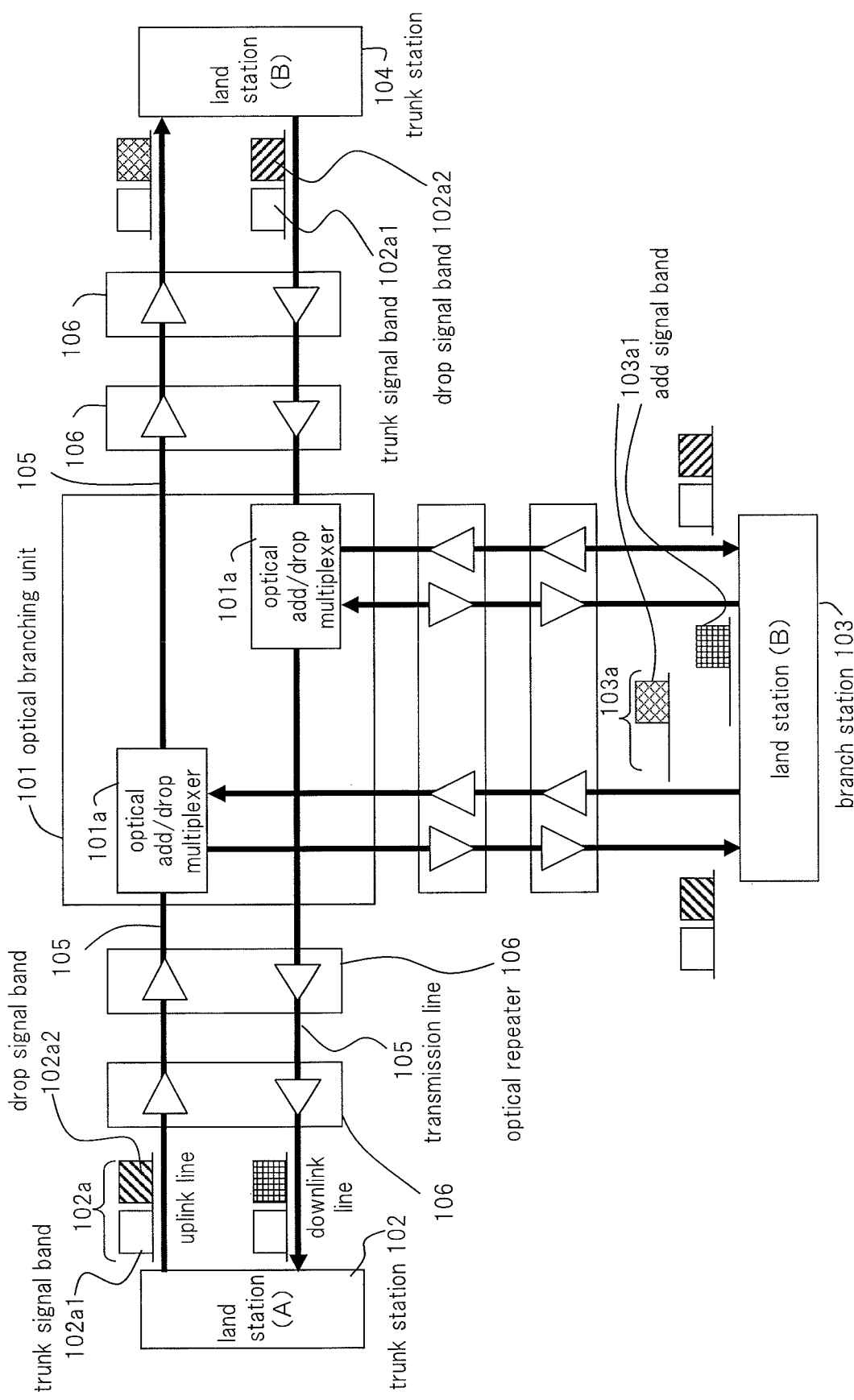
FIG. 1 is a block diagram showing an optical submarine cable system that includes an optical branching unit.

An exemplary embodiment of the present invention is next described with reference to the accompanying drawings.

FIG. 3 is a block diagram showing optical branching unit 1 of an exemplary embodiment of the present invention. Optical branching unit 1 is used in place of optical branching unit 101 shown in FIG. 1. In the interest of simplifying explanation, only the flow of signals in one direction is represented in FIG. 3, but in actuality, there are also signals in the reverse direction. In addition, components that are identical to components shown in FIG. 1 are given the same reference numbers.

Optical branching unit 1 includes two input ports 2 and 3, two output ports 4 and 5, optical amplifier 6, detector 7, control unit 8, optical amplifier 9, detector 10, control unit 11, and add/drop multiplexer 12. Add/drop multiplexer 12 includes optical coupler 13, optical filters 14 and 15, and optical coupler 16.

Trunk signal 102a that is transmitted from a trunk station is applied as input to input port 2. Trunk signal 102a can be typically referred to as an optical signal or a designated optical signal.

Branch signal 103a that is sent from a branch station is applied as input to input port 3. Branch signal 103a can typically be referred to as a designated optical signal or an optical signal.

Optical amplifier 6 can typically be referred to as an optical amplification means or designated optical amplification means. Optical amplifier 6 can change gain. Optical amplifier 6 may be configured as a single optical amplifier or may be configured as a plurality of optical amplifiers that are connected in multiple stages.

Upon receiving trunk signal 102a by way of input port 2, optical amplifier 6 amplifies trunk signal 102a and supplies as output trunk signal 102a that follows amplification. Alternatively, when optical amplifier 6 does not receive trunk signal 102a, optical amplifier 6 amplifies the amplified spontaneous emission that is generated in optical amplifier 6 itself and supplies the amplified spontaneous emission that follows amplification as ASE noise.

Detector 7 can typically be referred to as detection means or designated detection means. Detector 7 detects whether trunk signal 102a is applied as input to optical amplifier 6. In the present exemplary embodiment, detector 7 detects whether trunk signal 102a is being applied as input to optical amplifier 6 by monitoring input to optical amplifier 6.

Control unit 8 can also typically be referred to as control means or designated control means.

Upon detection by detector 7 that trunk signal 102a is not being applied as input to optical amplifier 6, control unit 8 sets the gain that determines the magnitude of amplification in optical amplifier 6 to a predetermined value that is a value greater than the gain of optical amplifier 6 when trunk signal 102a is being applied as input to optical amplifier 6.

For example, control unit 8 includes memory in which is stored a predetermined value (the gain of optical amplifier 6 that is necessary when trunk signal 102a is cut), and when detector 7 detects that trunk signal 102a is not being applied as input to optical amplifier 6, control unit 8 reads the predetermined value from this memory and sets the gain of optical amplifier 6 to the predetermined value that was read.

Optical amplifier 9 can also typically be referred to as designated optical amplification means or optical amplification means. Optical amplifier 9 allows alteration of gain. Optical amplifier 9 may be configured by, for example, a single optical amplifier or may be configured by a plurality of optical amplifiers connected in multiple stages.

Upon receiving branch signal 103a by way of input port 3, optical amplifier 9 amplifies branch signal 103a and supplies as output branch signal 103a that follows amplification. Alternatively, when branch signal 103a is not being received as input, optical amplifier 9 amplifies the amplified spontaneous emission that is generated in optical amplifier 9 itself and supplies the amplified spontaneous emission that follows amplification as ASE noise.

Detector 10 can also be typically referred to as designated detection means or detection means. Detector 10 detects whether branch signal 103a is being applied as input to optical amplifier 9. In the present exemplary embodiment, detector 10 detects whether branch signal 103a is being applied as input to optical amplifier 9 by monitoring the input to optical amplifier 9.

Control unit 11 can be typically referred to as a designated control means or control means.

When detector 10 detects that branch signal 103a is not being applied as input to optical amplifier 9, control unit 11 sets the gain that determines the magnitude of amplification in optical amplifier 9 (the designated gain) to a designated value that is a value greater than the gain of optical amplifier 9 when branch signal 103a is being applied as input to optical amplifier 9.

For example, control unit 11 has a memory in which is stored a designated value (the gain of optical amplifier 9 that is necessary when branch signal 103a is cut), and when detector 10 detects that branch signal 103a is not being applied as input to optical amplifier 9, control unit 11 reads the designated value from the memory and sets the gain of optical amplifier 9 to the designated value that was read.

Add/drop multiplexer 12 can typically be referred to as add/drop multiplexing means.

Add/drop multiplexer 12 receives output light from optical amplifier 6 and output light from optical amplifier 9. Add/drop multiplexer 12 multiplexes the optical signal (an optical signal of a wavelength that belongs to trunk signal band 102a1) of a predetermined wavelength that is contained in the output light from optical amplifier 6 and an optical signal (an optical signal of a wavelength that belongs to add signal band 103a1) of a designated wavelength that is contained in the output light from optical amplifier 9.

Optical coupler 13 sends the output light from optical amplifier 6 to optical filter 14 and output port 4.

Optical filter 14 transmits only optical signals of wavelengths that belong to trunk signal band 102a1. As a result, optical signals of wavelengths that belong to trunk signal band 102a1 are supplied as output from optical filter 14.

Optical filter 15 transmits only optical signals of wavelengths that belong to add signal band 103a1. As a result, optical signals of wavelengths that belong to add signal band 103a1 are supplied as output from optical filter 15.

Optical coupler 16 multiplexes an optical signal of wavelengths that belong to trunk signal band 102a1 and optical signal of wavelengths that belong to add signal band 103a1 to generate a multiplexed signal and supplies this multiplexed signal from output port 5 to a trunk station (receiving station) by way of optical repeaters.

Operations are next described.

When optical signals (trunk signal 102a or branch signal 103a) are normally being applied as input, optical amplifiers 6 and 9 amplify the input optical signals to a desired level (see FIG. 4).

In contrast, when trunk signal 102a is not being applied as input to optical amplifier 6, detector 7 detects that trunk signal 102a is not being applied to optical amplifier 6 by monitoring the input to optical amplifier 6. Detector 7 supplies this detection result to control unit 8.

Upon receiving this detection result, control unit 8 sets the gain of optical amplifier 6 to a predetermined value that is greater than the gain of optical amplifier 6 when trunk signal 102a is being applied as input to optical amplifier 6.

As a result, optical amplifier 6 amplifies the amplified spontaneous emission that is generated in optical amplifier 6 at the gain that was adjusted to the predetermined value to generate ASE noise. Optical amplifier 6 supplies this ASE noise (see FIG. 5).

The amplified spontaneous emission is faint. As a result, in the present exemplary embodiment, the gain of optical amplifier 6 when amplifying amplified spontaneous emission is made greater than the gain of optical amplifier 6 when trunk signal 102a is being applied as input to optical amplifier 6, whereby the output level of the ASE noise is made to correspond to the output level of trunk signal 102a that is amplified in optical amplifier 6.

The ASE noise from optical amplifier 6 is applied as input to optical coupler 13.

Optical coupler 13 branches the light that was received as input to two outputs and supplies the outputs to optical filter 14 and output port 4, respectively.

Optical filter 14 transmits only optical signals of wavelengths that belong to trunk signal band 102a1.

When branch signal 103a is not applied as input to optical amplifier 9, detector 10 detects that branch signal 103a is not being applied to optical amplifier 9 by monitoring the input to optical amplifier 9. Detector 10 supplies this detection result to control unit 11.

Upon receiving this detection result, control unit 11 sets the gain of optical amplifier 9 to a designated value that is greater than the gain of optical amplifier 9 when branch signal 103a is being applied as input to optical amplifier 9.

As a result, optical amplifier 9 amplifies the amplified spontaneous emission that is generated in optical amplifier 9 by the gain that was adjusted to the designated value to generate ASE noise. Optical amplifier 9 supplies this ASE noise as output (see FIG. 5).

In the present exemplary embodiment, the gain of optical amplifier 9 when amplifying the amplified spontaneous emission is set greater than the gain of optical amplifier 9 when branch signal 103a is being applied as input to optical amplifier 9, whereby the output level of ASE noise is made to correspond to the output level of branch signal 103a that is amplified in optical amplifier 9.

The ASE noise from optical amplifier 9 is sent to optical filter 15. Of the ASE noise from optical amplifier 9, optical filter 15 transmits only optical signals of wavelengths that belong to add signal band 103a1 (see FIG. 6).

FIG. 7 shows the reception spectrum of the optical signal (hereinbelow referred to as "received optical signal") that receiving station receives from optical add/drop multiplexer 1 in a state in which both trunk signal 102a is applied as input to input port 2 and branch signal 103a is applied as input to input port 3.

As shown in FIG. 7, in the received optical signal, an optical signal (signal A) of a wavelength that belongs to trunk signal band 102a1 contained in trunk signal 102a and optical signal (signal B) of a wavelength that belongs to add signal band 103a1 that is contained in the output light from optical amplifier 9 are multiplexed.

FIG. 8 shows the received spectrum of an optical signal (received optical signal) that a receiving station receives from optical add/drop multiplexer 1 in a state in which one of two inputs (trunk signal 102a and branch signal 103a) of optical add/drop multiplexer 1 is not received.

As shown in FIG. 8, the multiplexing of ASE noise that has passed through optical filters and an optical signal from the other input enables suppression of increase of the signal level of the trunk signal and thus a reduction of the deterioration of the transmission characteristic.

According to the present exemplary embodiment, when detector 7 detects that trunk signal 102a is not being applied as input to optical amplifier 6, control unit 8 sets the gain of optical amplifier 6 to a predetermined value that is greater than the gain of optical amplifier 6 when trunk signal 102a is being applied as input to optical amplifier 6.

The level of the ASE noise is thus adjusted, and the output-power constant-control carried out by the optical add/drop multiplexing system described in Patent Document 1 need not be implemented. Accordingly, deterioration of the transmission characteristic of a survivor signal can be suppressed without carrying out the complex control that is output-power constant-control.

In addition, in the present exemplary embodiment, when detector 10 detects that branch signal 103a is not being applied as input to optical amplifier 9, control unit 11 sets the gain of optical amplifier 9 to a designated value that is greater than the gain of optical amplifier 9 when branch signal 103a is being applied as input to optical amplifier 9.

Thus, in this case as well, the level of ASE noise is adjusted, and output-power constant-control need not be implemented. As a result, deterioration of the transmission characteristic of a survivor signal can be suppressed without carrying out complex control of constant power output.

In addition, the optical add/drop multiplexer that is made up from optical amplifier 6, detector 7, control unit 8, and add/drop multiplexer 12 is also able to exhibit the effect of enabling suppression of deterioration of the transmission characteristic of a survivor signal without carrying out complex control of constant power output. In this case, branch signal 103a is applied as input directly to add/drop multiplexer 12.

In addition, the optical add/drop multiplexer that is made up of optical amplifier 9, detector 10, control unit 11 and add/drop multiplexer 12 is also able to exhibit the effect of enabling suppression of the deterioration of the transmission characteristic of a survivor signal without carrying out complex control of constant power output. In this case, trunk signal 102a is applied as input directly to add/drop multiplexer 12.

An optical amplifier that is used in a submarine repeating system operates by pump power-output constant-control (APC: Automatic Pump Power Control) and not by output-power constant-control (ALC: Automatic Level Control). This is because, in a submarine multistage repeating system in which repair cannot be easily implemented in the event of an increase in loss in a portion of the transmission path fiber, a self-healing function is effectively employed that both prevents significant deterioration in SNR (Signal to Noise Ratio) and allows gradual recovery of signal level. Accordingly, a construction that operates by APC and not by ALC is both functionally and economically preferable in an optical amplifier that is incorporated in optical add/drop multiplexer 1, as in the present exemplary embodiment.

In addition, a problem occurs in an optical repeating system in which, although ASE is applied as input to an optical add/drop multiplexer if an optical repeater is present between a cable break point and the optical add/drop Multiplexer, ASE is not applied as input when a cable break occurs in the immediate vicinity of an optical add/drop multiplexer. In order to solve this problem in the present exemplary embodiment, at least one of optical amplifiers 6 and 9 that function as optical repeaters is installed in optical branching unit 1 in which add/drop multiplexer 12 is installed.

In this case, add/drop multiplexer 12 and amplifier 6 or 9 are installed in the same optical branching unit, whereby the cable between add/drop multiplexer 12 and optical amplifier 6 or 9 is installed in the same optical branching unit. As a result, the possibility of the occurrence of a fault in this cable can be reduced compared to a case in which the cable between add/drop multiplexer 12 and optical amplifier 6 or 9 is installed outside the optical branching unit (for example, on the sea floor). This enables a reduction of states in which add/drop multiplexer 12 is unable to use ASE noise from optical amplifier 6 or 9.

An optical branching unit composed of optical amplifier 6 and add/drop multiplexer 12 or an optical branching unit composed of optical amplifier 9 and add/drop multiplexer 12 can provide the effect of decreasing states in which add/drop multiplexer 12 is unable to use ASE noise from optical amplifier 6 or 9.

In the present exemplary embodiment, detector 7 detects whether trunk signal 102*a* is being applied as input to optical amplifier 6 by monitoring input to optical amplifier 6.

In this case, adjustment of the gain of optical amplifier 6, i.e., adjustment of the level of ASE noise starts at the point in time at which trunk signal 102*a* is no longer applied to optical amplifier 6, whereby the timing at which adjustment of the level of ASE noise starts can be advanced.

This point is next described.

Deterioration of the transmission characteristic of a survivor signal can be suppressed without carrying out complex control of constant power output even if, for example, detector 7 detects whether trunk signal 102*a* is being applied as input to optical amplifier 6 by monitoring output of optical amplifier 6.

Nevertheless, in this case, adjustment of the level of ASE noise begins after ASE noise is supplied from optical amplifier 6 following the cessation of the input of trunk signal 102*a* to optical amplifier 6. This results in the passage of time from the cessation of input of trunk signal 102*a* to optical amplifier 6 to the start of adjustment of the level of ASE noise. The time from the cessation of input of trunk signal 102*a* to optical amplifier 6 until the start of the adjustment of the level of ASE noise is hereinbelow referred to as "preparation time."

The longer the preparation time, the longer the time that ASE noise, for which level has not been adjusted, is supplied from optical amplifier 6, resulting in delay of the timing of the start of prevention of excessive amplification of the survivor signal due to the use of ASE noise.

Accordingly, the longer the preparation time, the longer the time interval in which the transmission characteristic of the survivor signal is degraded.

In contrast, when detector 7 detects whether trunk signal 102*a* is being applied as input to optical amplifier 6 by monitoring input to optical amplifier 6, detector 7 is able to more quickly detect the cessation of input of trunk signal 102*a* to optical amplifier 6, whereby the preparation time can be shortened and the time interval of deterioration of the transmission characteristic of the survivor signal can be reduced.

Still further, when detector 10 detects whether branch signal 103*a* is being applied as input to optical amplifier 9 by monitoring input to optical amplifier 9, the preparation time can be shortened, and the time interval in which the transmission characteristic of the survivor signal is degraded can be reduced.

It is here explained that what is implemented in the present exemplary embodiment is not feedback control that controls the gain of optical amplifier 6 in accordance with the output of optical amplifier 6, but rather feedforward control that controls the gain of optical amplifier 6 in accordance with the input to optical amplifier 6, and moreover, not feedback control that controls the gain of optical amplifier 9 in accordance with the output of optical amplifier 9, but rather, feedforward control that controls the gain of optical amplifier 9 in accordance with the input to optical amplifier 9.

In order to achieve stable operation of feedback control, control parameters must be set appropriately to prevent, for example, the oscillation of a control loop, and in particular, extremely careful design is necessary when there is a plurality of feedback controls in a device or system. However, this concern is eliminated in feedforward control and the design of a control system is correspondingly facilitated.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2009-239011 for which application was submitted on Oct. 16, 2009 and incorporates by citation all of the disclosures of that application.

EXPLANATION OF REFERENCE NUMBERS

1 optical branching unit
2, 3 input port
4, 5 output port
6, 9 optical amplifier
7, 10 detector
8, 11 control unit
12 add/drop multiplexer
13, 16 optical coupler
14, 15 optical filter

What is claimed is:
1. An optical branching unit comprising:
an optical amplification unit that, when an optical signal is received as input, amplifies and supplies the optical signal, or, when said optical signal is not received as input, amplifies and supplies amplified spontaneous emission that the optical amplification unit itself generates;
a detection unit that detects whether said optical signal is applied as input to said optical amplification unit;
a control unit that, when said detection unit detects that said optical signal is not applied as input to said optical amplification unit, sets gain that determines the magnitude of amplification in said optical amplification unit to a predetermined value that is greater than said gain when said optical signal is applied as input to said optical amplification unit;

an add/drop multiplexing unit that receives output light from said optical amplification unit and other output light and that multiplexes an optical signal of a predetermined wavelength that is contained in the output light from said optical amplification unit and an optical signal of a designated wavelength that is contained in said other output;

a designated optical amplification unit that, when a designated optical signal is received as input, amplifies that designated optical signal to supply it as said other output light, or, when said designated optical signal is not received as input, amplifies and supplies amplified spontaneous emission, which said designated optical amplification unit itself generates, as said other output light;

a designated detection unit that detects whether said designated optical signal is applied as input to said designated optical amplification unit; and a designated control unit that, when said designated detection unit detects that said designated optical signal is not applied as input to said designated optical amplification unit, sets designated gain that determines the magnitude of amplification in said designated optical amplification unit to a designated value that is greater than said designated gain at the time when said designated optical signal is applied as input to said designated optical amplification unit.

2. The optical branching unit according to claim 1, wherein said detection unit detects whether said optical signal is applied as input to said optical amplification unit by monitoring input to said optical amplification unit.

3. The optical branching unit according claim 1, wherein said designated detection unit detects whether said designated optical signal is applied as input to said designated optical amplification unit by monitoring input to said designated optical amplification unit.

4. An optical communication system comprising:
the optical branching unit as set forth in claim 1;
a first optical repeater that supplies said optical signal to an optical amplification unit that is contained in said optical branching unit; and
a second optical repeater that supplies said other output light to an add/drop multiplexing unit that is contained in said optical branching unit.

5. An optical multiplexing method that is an optical multiplexing method in an optical branching unit that includes an optical amplification unit that, when an optical signal is received as input, amplifies and supplies said optical signal, and when said optical signal is not received as input, amplifies and supplies amplified spontaneous emission that said optical amplification unit itself generates said optical multiplexing method comprising:

detecting whether said optical signal is received as input in said optical amplification unit;

upon detecting that said optical signal is not received as input in said optical amplification unit, implementing control to set gain that determines the magnitude of amplification in said optical amplification unit to a predetermined value that is greater than said gain when said optical signal is received as input in said optical amplification unit;

receiving output light from said optical amplification unit and other output light, and multiplexing an optical signal of a predetermined wavelength that is contained in output light from said optical amplification unit and an optical signal of a designated wavelength that is contained in said other output light, wherein said optical branching unit includes a designated optical amplification unit that, when a designated optical signal is received as input, amplifies and supplies said designated optical signal as said other output light, and when said designated optical signal is not received, amplifies and supplies amplified spontaneous emission, which said designated optical amplification unit itself generates, as said other output light, and wherein the optical multiplexing method further comprises:

detecting whether said designated optical signal is applied as input to said designated optical amplification unit; and upon detecting that said designated optical signal is not applied as input to said designated optical amplification unit, implementing control to set designated gain that determines the magnitude of amplification in said designated optical amplification unit to a designated value that is greater than said designated gain when said designated optical signal is applied as input to said designated optical amplification unit.

6. The optical multiplexing method according to claim 5, wherein said detecting is detecting whether said optical signal is applied as input to said optical amplification unit by monitoring input to said optical amplification unit.

7. The optical multiplexing method according to claim 5, wherein detecting whether said designated optical signal is applied as input to said designated optical amplification unit is detecting whether said designated optical signal is applied as input to said designated optical amplification unit by monitoring input to said designated optical amplification unit.

* * * * *